Dec. 7, 1954 W. DUBILIER 2,696,546
PROCESS AND APPARATUS FOR SOLDERING
Filed Sept. 29, 1952
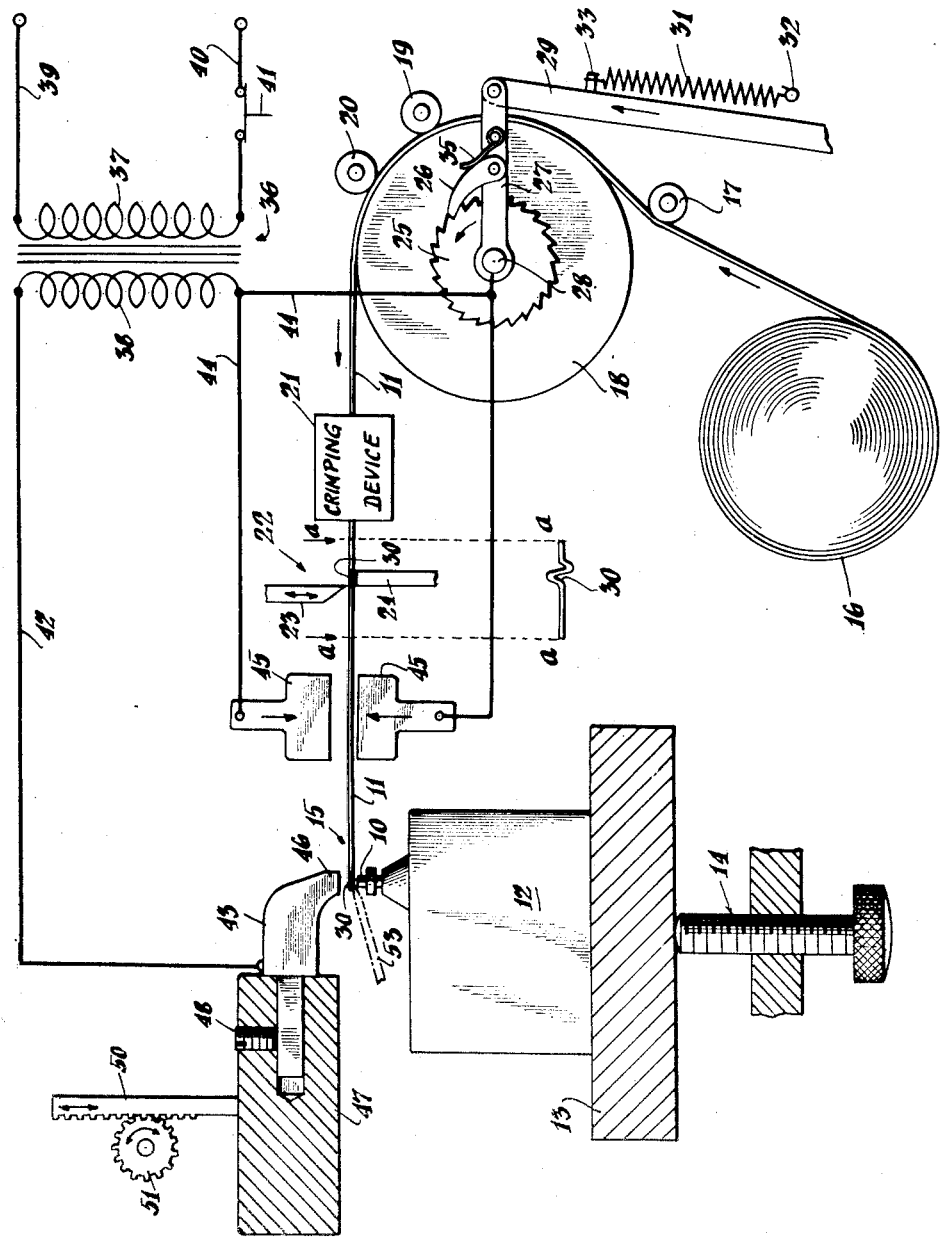
INVENTOR
William Dubilier
BY
ATTORNEY United States Patent Office 2,696,546
Patented Dec. 7, 1954

2,696,546

PROCESS AND APPARATUS FOR SOLDERING

William Dubilier, New Rochelle, N. Y., assignor to Cornell-Dubilier Electric Corporation, Middlesex County, N. J., a corporation of Delaware Application September 29, 1952, Serial No. 312,099

7 Claims. (Cl. 219—12)

This invention relates to a process and apparatus for soldering and more particularly to a novel process and means of soldering readily adaptable to automatic operation.

In soldering two or more metal pieces together, such as a terminal and a lead wire, it has been necessary to use a soldering iron which is heavy and radiates a considerable amount of heat from its large mass although only the tip comes in contact with the solder. In addition to heat losses, another disadvantage of the soldering iron is that the heat in the proximity of the iron is uncomfortable for the operator especially in warm weather, and furthermore, if the equipment upon which the soldering is being done is heat-sensitive, such equipment may be damaged or means must be provided to insulate the equipment from the head of the soldering iron.

In addition to the above-mentioned operating difficulties, the irons must be scraped every hour or two when in operation to remove the corrosive scale, reshape the tip and remove dirt which accumulates at the tip. The irons are subject to rapid corrosion and must be replaced as frequently as every two weeks. Because of the need for replacing them frequently, the irons become a sizeable cost item.

An important object of this invention is therefore to provide a soldering process wherein the heat losses may be reduced and wherein the amount of heated material in the soldering area is kept to a minimum to avoid damage to heat-sensitive equipment upon which the soldering is being done and to relieve the discomfort to the operator caused by too much heat.

An additional object is to provide a soldering process and means for effecting such process which does not require the heating of a large soldering iron mass; and also does not require the scraping and frequent replacement of a soldering iron.

A further object is to provide a process and means which is more economical and efficient in operation, may be operated with greater ease and faster than other soldering operations, and which is readily adaptable to automatic or semi-automatic operation.

Broadly, the invention comprises the process of uniting two pieces of metal together by heating one of the pieces to soldering temperature, applying solder to that piece, pressing the two pieces together. It is contemplated that the heating may be achieved by passing an electric current through one of the metal pieces so that the piece becomes hot enough to melt solder. The pieces are pressed together so as to form the soldered joint. The process may be carried out by semi or fully automatic equipment including means for feeding successive pairs of pieces to be soldered to a soldering station, means for completing an electrical circuit through one piece of each pair and means for pressing the two pieces of each pair together as solder is applied. In operations wherein one or both pieces of each pair are taken from a continuous integral supply, e. g. a spool or reel of wire, means may also be provided for severing such pieces at predetermined distances from the soldered joint after the soldering operation. Means may also be provided in combination with the other elements for preparing the pieces for soldering, such as means for crimping the end of each successive piece to provide a larger soldering area at the soldering joint. In a device for carrying out the process of this invention, the means for pressing the pieces together may also be the means for completing the electrical circuit through one of the pieces.

For a more complete description, reference is made to the drawing which shows a diagrammatic side view of a device embodying the invention.

One application in which the novel concept of this invention is particularly useful is in soldering wire leads to devices, such as resistors, condensers and terminals of other types of apparatus.

In the drawing, the two metal pieces to be soldered together are terminal 10 and wire 11. The terminal 10 may be for a device 12 which is removably positioned on platform 13. The platform may be disposed at a predetermined height so that the terminal 10 of the device 12 is maintained at a selected position, i. e. directly below the end of wire 11, in the soldering station which is designated generally at 15.

The wire 11 may be fed from a supply reel 16, passing around idler roller 17, and over a suitable feed roller 18. Rollers 19 and 20 may be pressed against the feed roller 18 to assure positive feed. The wire thereafter passes through crimping device 21 and cutting device 22.

The wire may be fed to the soldering station 15 in predetermined lengths by suitable means such as by a ratchet 25 and pawl 26. The feed roller 18 is fixed to the ratchet and the pawl is mounted on link member 27. The link member 27 is pivotally mounted at one end on shaft 28, i. e. the shaft upon which feed roller 18 and ratchet 25 are mounted. The other end of link member 27 is pivotally connected to link 29. Upward movement of the link 29 causes the link 27 to push the pawl and the ratchet to move the feed roller in a counter-clockwise direction whereby the wire 11 is fed in the direction of the arrows through the device.

Spring 31 may be provided attached to a fixed stud at one end and at the other end to a stud 33 on the link 29 whereby the link 29 is urged downward after its upward stroke and the pawl moves clockwise over the ratchet teeth to assume a new position. Leaf spring 35 presses the pawl into the new position on the ratchet wheel 25. The link 29 may be actuated by any suitable means.

The electrical circuit employed in the device may include a transformer 36 having primary winding 37 and secondary winding 38. The conductors 39 and 40 are connected to a suitable source of power, a switch 41 being provided in conductor 40.

Conductor 42 from one terminal of the secondary winding may be connected to a metallic electrode rod 43 and conductors 44 from the other terminal of the secondary winding may be connected, in parallel, to the feed wheel 18 through shaft 28 and to contacts 45.

The rod 43 which may be of a metal which does not wet with solder, such as tungsten, aluminum, or other suitable metal, is detachably mounted in a holder 47 and held therein by means such as set screw 48. The holder is mounted for movement to cause the rod 43 to move toward and away from the soldering station 15. The movement may be effected by any suitable means, as for example, by a rack 50 and pinion 51, the latter being driven to cause the rack, which is attached to the holder, to move in either direction.

To carry out the process of this invention, wire 11 is fed to the position shown in the soldering station 15 by suitable means such as the ratchet means described. A device 12 is positioned on platform 13 with the terminal 10 of the device disposed directly below the end of the wire 11. The rod 43 is moved downward so that end 46 thereof contacts the wire 11 and presses it against the terminal 10. The contact of the rod 43 with the wire 11 completes the circuit through conductor 42, secondary winding 38, conductor 44, feed roller 18; the switch 41 being closed to complete the circuit of the primary winding, heavy current and low voltage being provided to the wire 11. Contacts 45 are also moved into engagement with the wire to make further contact with the wire to supplement the contact through axle 28 and feed roller 18. Due to the comparatively heavy current and preferably low voltage passing through the electrode rod 43 into the wire, the wire will become hot especially at the contact point between the end 46 of the rod 43 and the wire.

A wire 53 of solder, shown in broken line, is then applied to the wire 11 around the heated zone. The solder melts easily upon contact with the wire and flows around making a good electrical and mechanical contact and bond between the wire 11 and the terminal 10. Because the heat generated is due to the current passing through the wire, the electrode rod 43 does not get hot except at the contact point or end 46.

After the soldering operation, the rod 43 is raised and the contacts 45 move out of engagement with the wire 11. The length of wire 11 between the cutter 22 and soldering station 15 may be severed from the continuous wire supply by the blade element 23 moving downward and cutting the wire against the shearing shoulder 24.

The device 12 then may be moved from the platform 13 with the lead wire securely soldered to the terminal 10.

For the next soldering cycle, the ratchet feeding mechanism is operated to advance the wire from the cutter 22 to the soldering station 15 and another device is positioned on the platform 13 with its terminal directly below the end of the wire and the end 46 of the electrode rod 43.

As the wire 11 is fed to the soldering station after each successive soldering cycle, the length of wire immediately adjacent the length to be soldered is passed through the crimping device 21 wherein a segment of the wire is crimped laterally during the feed and just prior to the end of the feed movement so that the crimped segment 30 is moved out of the crimping device and is adjacent the cutter 22 when the feed movement is complete. In this manner, the end of each successive length of wire which is presented at the soldering station is laterally crimped to provide a greater surface of wire at the solder point whereby the soldered contact is stronger than if a single straight length of wire were presented. The crimping device 21 may consist of any well known suitable wire-crimping or wire-bending means for crimping the wire to a suitable shape such as that shown in projected plan view in the figure which is a view taken along the line a—a.

The platform 13 may be vertically adjustable as indicated at 14 so that devices of various dimensions may be positioned on the platform 13 each with its terminal in soldering position.

By the process and means described, wires may be soldered to terminals without the use of the standard type soldering iron which has given great difficulty and which has been expensive because of the deterioration of the iron and the constant requirement for keeping the tip clean and in a special shape. With this invention, the rod, i. e. the electrode 43, may be of tungsten or other suitable material, as noted above, which does not wet with solder and therefore is always clean and does not deteriorate rapidly for there is little or comparatively no heat generated in the rod itself.

From the foregoing description, it will be appreciated that the process and means of this invention achieve the desired objects of providing a soldering process and means wherein heat losses are reduced and the amount of heating in the soldering operation is kept to a minimum to avoid damage to heat sensitive equipment, and also to relieve the discomfort of the operators. Furthermore, the invention provides a process which does not require frequent replacement of a soldering iron nor the constant scraping and repair of such iron. The invention fulfills the further object of providing more economical and efficient operation whereby pieces may be soldered faster and more economically and the entire operation is readily adaptable to automatic or semi-automatic operation. With regard to the automatic type operation, it will be appreciated from the foregoing description that the various elements for feeding the wire, crimping the wire, cutting the wire, and the rod contact and the engagement of the contacts 45 may all be coordinated to operate sequentially in a synchronized predetermined plan, the operation being either automatic; or, semi-automatic in that each cycle may be controlled by an operator. The means for coordinating such a device are well-known and various means are equally adaptable. With regard to the automatic operation of the apparatus, it will also be appreciated that the solder wire 53 and the devices 12 may also be automatically fed to the soldering station 15, or, if the apparatus is semi-automatic in that each cycle is initiated by an operator, or otherwise, the operator may also feed the solder and the devices 12 manually to the soldering station.

It is presently preferred to make the connection to the wire 11 through means such as the electrodes or contacts 45 as close as practical to the soldering point so that the heat generated is in the smallest possible area and as close as practical to the soldering point. Such an arrangement requires less energy and radiates a smaller amount of heat than if the contacts were spaced more remotely from the soldering station.

It will be understood that this invention can be adapted for many purposes and can be carried out in various ways. For example, the invention may be utilized for soldering a flat strip or ribbon of metal to a terminal or other piece of metal and one of the electrode connections for the ribbon may be connected to the terminal, i. e. the other piece of metal to be soldered, instead of to the electrode rod 43, in which case, the rod 43 becomes merely a pressure rod, and, not being a conductor, may be made of Bakelite, ceramic or other suitable insulating material.

In addition, the invention may be used for soldering any two pieces of metal together especially when one piece is of such dimensions that it is practical to generate heat in it by passing current therethrough. Furthermore, if one of the two pieces is heavier than the other, current could be passed through the lighter piece of metal with the other piece being used as the connecting electrode for completing the circuit, the lighter, or smaller piece, having greater resistance, heats up.

In accordance with the provisions of the patent statutes, I have herein described the principle of operation of the invention, together with the elements which I now consider the best embodiments thereof, but I desire to have it understood that the structure disclosed is only illustrative and the invention can be carried out by other means. Also, while it is designed to use the various features and elements in the combinations and relations described, some of these may be altered and modified without interfering with the more general results outlined.

Having thus described my invention, I claim:

1. A process for soldering a wire lead to a metal terminal, comprising, feeding successive lengths of wire from a continuous supply thereof to a soldering station, disposing a terminal to which the wire is to be soldered adjacent the end of the wire, completing an electrical circuit through the wire by contacting the wire at a point spaced from the soldering station and also at the end of the wire in the soldering station passing an electrical current through said wire whereby it is raised to soldering temperature, and applying solder to the wire while pressing the wire against the terminal.

2. A process for soldering wire leads to metal terminals, comprising, feeding successive lengths of wire from a continuous supply thereof so that one end of each successive length of the wire is disposed in a soldering station, positioning a terminal to which the wire is to be attached adjacent the end of the length of wire, passing an electrical current through said wire by contacting the wire at its end and also at a point spaced from the end with electrical conductors connected to form a circuit through the wire whereby the wire is raised to soldering temperature, applying solder to the wire while pressing the wire against the terminal, breaking the contacts with the wire, and severing a length of wire from the continuous supply thereof.

3. The process of claim 2 including the additional step of crimping the end, of each successive length of wire, which is to be soldered.

4. A soldering process for uniting two pieces of metal, one of which has greater electrical resistance than the other, comprising, sending an electrical current through the piece which has greater electrical resistance thereby heating it to soldering temperature and pressing it against the other piece as solder is applied and melted by said one piece to join the two, the electrical current being passed through the piece with greater resistance by contacting it at a point spaced from the soldering point and by contacting it, at the soldering point, with the other piece through which current is passed.

5. An apparatus for soldering two pieces of metal together, comprising, means for disposing said two pieces adjacent one another in a soldering station, means for completing an electrical circuit through one of said pieces including a contact spaced from the station and a pressing rod contact at the station adapted for completing the electrical circuit through said one piece and whereby said piece may be heated to soldering temperature, said rod contact also being adapted for pressing the two pieces together for forming the soldering joint.

6. A soldering process for uniting two metal pieces together, comprising, disposing the two pieces to be soldered in a soldering station, passing an electrical current through one of said pieces whereby it is heated to soldering temperature by contacting at a point spaced from the soldering station and by contacting it with a pressing rod conductor in the station, applying solder to the heated piece, and pressing the two pieces together with the pressing rod conductor to form the soldered joint.

7. A soldering process for uniting two pieces of metal one being of greater electrical resistance than the other, comprising, attaching one piece to one terminal of a source of electricity and attaching another piece to the other terminal of the electric source, touching the two pieces together at the desired soldering point, to form a circuit whereby the lighter piece becomes heated to soldering temperature, applying solder to the heated piece at the soldering point, breaking the electric circuit at a place spaced from the soldering point.

References Cited in the file of this patent

UNITED STATES PATENTS

| Number | Name | Date |
|---|---|---|
| 1,873,150 | Phelps et al. | Aug. 23, 1932 |
| 2,324,809 | Abbott et al. | July 20, 1943 |
| 2,437,151 | Braner | Mar. 2, 1948 |